Figure 1:
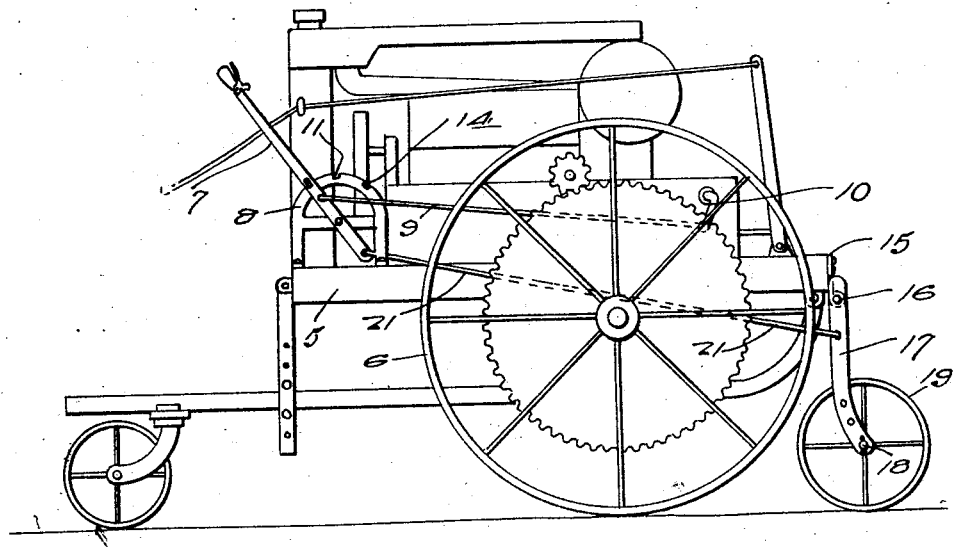

April 19, 1927.

E. E. WATERMAN 1,625,005

SAFETY ATTACHMENT FOR TRACTORS

Filed June 28, 1926

2 Sheets-Sheet 1

Inventor

E. E. Waterman

By Clarence A. O'Brien

Attorney

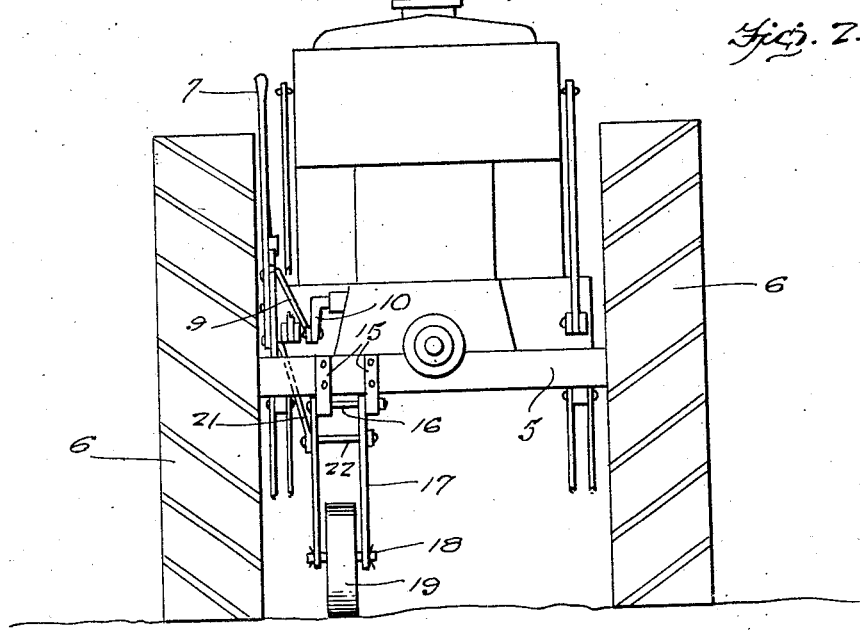
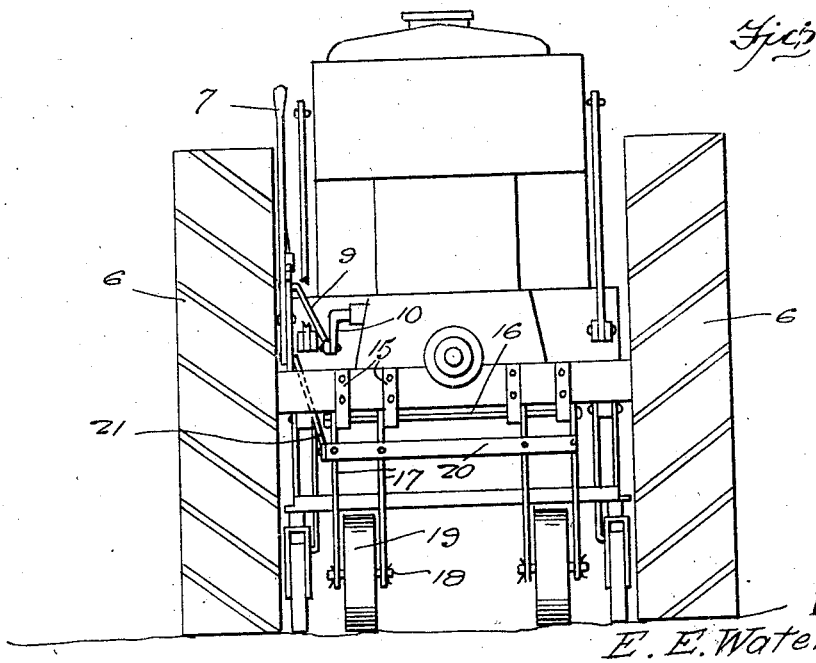

Patented Apr. 19, 1927.

1,625,005

UNITED STATES PATENT OFFICE.

ELMER E. WATERMAN, OF REMUS, MICHIGAN.

SAFETY ATTACHMENT FOR TRACTORS.

Application filed June 28, 1926. Serial No. 119,094.

The present invention relates to a safety device for tractors of one of the conventional types for the purpose of preventing the tipping of the tractor when in reverse speed.

The attachment is designed particularly, although not necessarily, for the tractor of the well known two-wheel type which has a tendency to tip when in reverse speed and pushing an agricultural implement or the like.

The important object of the invention is to provide an attachment of this nature which is controlled by the shifting lever so as to be in an out-of-the-way position when the gear shifting lever is in forward speed and to be brought to an active position when the gear shifting lever is in reverse speed position.

Another very important object of the invention resides in the provision of a device of this nature with an exceedingly simple construction, one which is easy to control and manipulate, thoroughly efficient and reliable in use, inexpensive to manufacture and install, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 4:
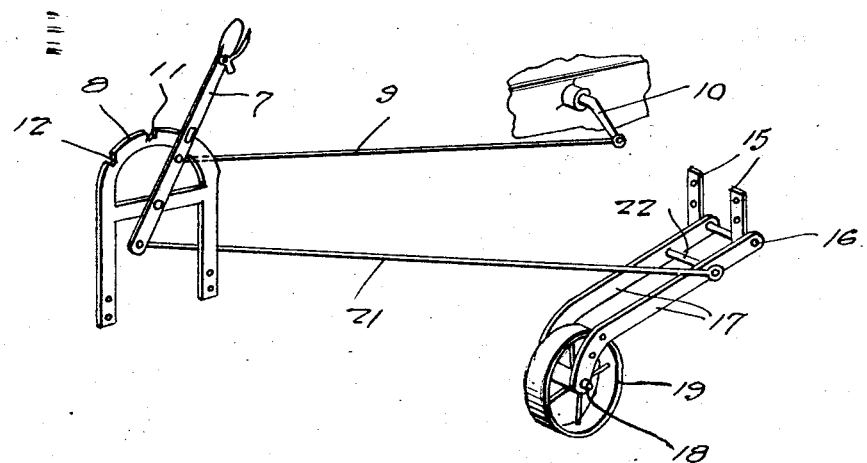

In the drawing;

Figure 1 is a side elevation of a tractor with my attachment associated therewith, Fig. 2 is a front elevation thereof, Fig. 3 is a front elevation showing another embodiment, and Fig. 4 is a detail perspective view showing the attachment per se with the operating means therefor.

Referring to the drawings in detail, it will be seen that I have illustrated a conventional type of two-wheel tractor including, among other elements, a chassis 5, bull wheels 6, gear shifting lever 7, and the notched segment 8 associated therewith for receiving the dog thereof to hold the lever in neutral, forward speed, or reverse speed.

In the particular type of tractor shown, the lever 7 controls the transmission through a rod 9 and crank 10. The notch 11 is the neutral position, while the notches 12 and 14 are respectively, reverse and forward speed positions.

Referring now specifically to my attachment, it will be seen that I mount a pair of straps 15 as is shown in Fig. 2, or two pairs of straps 15 as is shown in Fig. 3 on the forward end of the chassis 5. A bolt 16 is supported in the bottom ends of each pair of straps 15, and pivotally mounts a pair of standards 17, the lower ends of which are journaled the axle 18 of a wheel 19. In the embodiment shown in Fig. 3, the two pairs of standards are connected together by a bar 20. In the embodiment shown in Figs. 1 and 2, a rod 21 is engaged with a bolt 22 connecting the standard 17, and with the lower end of the lever 7 while in Fig. 3 this rod 21 is connected with one end of the bar 20 and with the lower end of lever 7.

It will thus be seen that when the lever 7 is in the reverse gear position shown in Fig. 1, that the wheel 19 is engaged with the ground. When the lever 7 is swung to neutral position, the wheel will be raised from the ground because the lower ends of the standards will be swung rearwardly through connecting rod 21, and when the lever is in forward speed position as is shown in Fig. 4, the wheel is raised still further from the ground.

When the tractor is thus moving forwardly, this wheel does not interfere with the steering in any way, but when the tractor is moving rearwardly, thus pushing the towed implement, the wheel 19 is in engagement with the ground, thus preventing the tractor from tipping.

From the above detailed description, it will be apparent that I have produced a very simple attachment, which is in an out-of-the-way position when inactive, and which is controlled by the shifting lever so as to eliminate the necessity of using any additional operating means. It is quite apparent that this attachment may be used to advantage on other types of conventional tractors than that which is shown in detail in this disclosure.

The present embodiments of the invention have been disclosed in detail merely by way of example, since in actual practice they attain the features of advantage enumerated as desirable in the statement of the invention and the above description. Numerous changes in the details of construction, and in the combination and arrangement of parts may be resorted to without departing from the spirit or scope of the invention as hereinafter claimed, or sacrificing any of its advantages.

Having thus described my invention, what I claim as new is:—

In combination, a tractor including a chassis and a gear shifting lever, a member pivoted on the forward end of the chassis, a wheel journaled on the free end of the member, and means connecting the member with the gear shift lever so that when said gear shift lever is in forward speed position, the wheel is swung out of engagement with the ground and when the lever is in reverse speed position, the wheel is in engagement with the ground for preventing tilting of the tractor.

In testimony whereof I affix my signature.

ELMER E. WATERMAN.